US006983395B2

(12) United States Patent
Chen et al.

(10) Patent No.: US 6,983,395 B2
(45) Date of Patent: Jan. 3, 2006

(54) MULTI-AGENT COOPERATIVE TRANSACTION METHOD AND SYSTEM

(75) Inventors: Qiming Chen, Sunnyvale, CA (US); Umeshwar Dayal, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 09/863,486

(22) Filed: May 23, 2001

(65) Prior Publication Data

US 2002/0178395 A1    Nov. 28, 2002

(51) Int. Cl.
*G06F 11/00* (2006.01)
(52) U.S. Cl. .................. 714/4; 714/2; 714/15; 714/18; 714/19; 714/20
(58) Field of Classification Search .................. 714/2, 714/15, 18–20, 4
See application file for complete search history.

(56) References Cited

U.S. PATENT DOCUMENTS

| | | | | |
|---|---|---|---|---|
| 5,287,501 | A | * | 2/1994 | Lomet .................. 707/202 |
| 5,940,839 | A | * | 8/1999 | Chen et al. .................. 707/202 |
| 6,122,625 | A | * | 9/2000 | Rosen .................. 705/65 |
| 6,178,463 | B1 | * | 1/2001 | Houston et al. ............ 719/315 |
| 6,324,161 | B1 | * | 11/2001 | Kirch .................. 370/217 |
| 6,665,820 | B1 | * | 12/2003 | Frowein et al. ............... 714/43 |
| 2001/0037311 | A1 | * | 11/2001 | McCoy et al. .................. 705/65 |
| 2002/0069117 | A1 | * | 6/2002 | Carothers et al. ............ 705/26 |
| 2002/0083344 | A1 | * | 6/2002 | Vairavan ..................... 713/201 |
| 2002/0116205 | A1 | * | 8/2002 | Ankireddipally et al. ...... 705/1 |
| 2002/0147611 | A1 | * | 10/2002 | Greene et al. ................. 705/1 |

* cited by examiner

*Primary Examiner*—Robert Beausoliel
*Assistant Examiner*—Michael C. Maskulinski

(57) ABSTRACT

A method and system for processing multi-agent cooperative transactions. A failure detector is provided for detecting whether a failure is an intra-enterprise failure or an inter-enterprise failure. An intra-enterprise failure handler is coupled to the failure detector for performing failure recovery for intra-enterprise failures. Failure recovery for intra-enterprise failures can include identifying the scope of failure recovery within a first enterprise. Once the scope of failure recovery has been identified, a top-down undo operation of sub-transactions in the identified scope may be performed within the first enterprise. An inter-enterprise failure handler is also coupled to the failure detector for performing failure recovery for inter-enterprise failures. Failure recovery for inter-enterprise failures can include identifying the scope of failure recovery in a second enterprise to which a failure in a first enterprise has been transfered. Once the scope of failure recovery has been identified, a top-down undo operation of sub-transactions in the identified scope may be performed in the second enterprise.

16 Claims, 4 Drawing Sheets

MULTI-AGENT COOPERATIVE TRANSACTION METHOD AND SYSTEM

FIELD OF THE INVENTION

The present invention relates to electronic commerce, and more specifically, to a multi-agent cooperative transaction method and system for enabling the automation of electronic commerce through the use of dynamic agents.

BACKGROUND OF THE INVENTION

Electronic commerce ("E-Commerce") is a distributed computing environment with dynamic relationships among a large number of autonomous service requesters, brokers and providers. One goal is to automate e-commerce applications by using software agents that cooperate to perform business transactions. Unfortunately, multi-agent cooperative transactions have requirements that are different from conventional transactions. Consequently, the prior art mechanism to handle transactions are not adequate to address the needs of multi-agent cooperative transactions.

An E-Commerce scenario typically involves well-known business activities and transactions. Example of these activities and transactions include 1) identifying requirements, 2) brokering products, 3) brokering vendors, 4) negotiating deals, 5) making purchase, and 6) making payment transactions. Today, these activities are initiated and executed primarily by humans. For example, an individual in a first company (e.g., company A) that is in need for a good or service contacts another company (e.g., company B) that may offer a desired good or service. A person in company B in turn answers questions about the suitability, availability and price of the requested good or service. In a larger company, different departments within the company can be delegated the tasks of determining product or service requirements, determining suitable vendors, negotiating a purchase, payment, etc. The growth of the Internet has simplified business transactions by allowing a vendor to offer information about its goods or services on its web site. In addition, limited on-line ordering and payment for goods and services may be provided at a web site.

Instead of having to speak with a person at company to determine the specifications and price of goods or services, one can simply access a relevant web page at the web site of the company being investigated. However, it is noted that human intervention is required at many steps in a typical business transaction. For example, even when the information is available on the Web, a person still needs to go to the specific web page, browse different pages to find the appropriate good and service, etc. Even if the order is placed on-line, a person must provide the payment information, ship-to information, etc. On the other end, a person or department is needed to manually process each order or request.

In the future, with the increasing automation of e-commerce, we see them being conducted by software agents. Software agents are personalized, continuously running and semi-autonomous computational entities that are driven by a set of beliefs, desires and intentions (BDI). They can be used to mediate between users (clients) and servers (service providers) to automate a number of the most time-consuming tasks in E-Commerce [3,16,18,19,20,22]. Moreover, agents can selectively preserve data and themselves become dynamic information sources, or data containers. E-Commerce automation can thus be accomplished through multi-agent cooperation, where agents perform various market activities and cooperate by exchanging data as well as programs.

One feature that distinguishes Internet-based e-commerce from traditional "brick and mortar" commerce is that agents can form dynamic partnerships that exist for only as long as they are needed. For example, agents that re-sell products, agents that supply products, and agents that provide brokering services may form a dynamic partnership for the duration of a specific business transaction. Also, agents may switch roles; for example, an agent may be a buyer in one transaction, a broker in another, and seller in a third. With the growth of the Internet and the information superhighway, the growth of electronic commerce (i.e., an increase in the number of electronic storefronts that offer products and services across the web) has also exploded. Dynamic agents and an electronic commerce infrastructure in which the dynamic agents can be deployed are described in greater detail in a publication entitled, "Dynamic Agents", by Q. Chen, P. Chundi, Umesh Dayal, M. Hsu, International Journal on Cooperative Information Systems, 1999, which is hereby incorporated by reference in its entirety.

An exemplary buy-sell transaction or process is described herein below. A typical purchase process can include the following individual transactions: 1) an order transaction ($T_{order}$), 2) a processing transaction ($T_{proc}$), 3) a payment transaction ($T_{payment}$), and 4) a shipping transaction ($T_{ship}$). Each of these transactions can be carried out by software programs (referred to herein as agents) that belong to the parties of the transactions. For example, the parties to the transaction include a buyer, a seller, and a bank that issued a credit card to the buyer, respectively.

There are generally three prior art approaches that can be used to model such a purchase transaction. These approaches include 1) distributed transactions, 2) nested transactions, and 3) transactional work-flows. As described herein below, theses prior art approaches to model a purchase transaction are inept to accurately describe a transaction across enterprises, and as such are limited to transactions occurring within an enterprise (i.e., intra-enterprise transactions).

Purchase Process Modeled as a Distributed Transaction

In the typical approach to implementing a distributed transaction, a transaction processing (TP) monitor is employed for providing centralized control. The sub-transactions (e.g., $T_{order}$, $T_{proc}$, $T_{payment}$, and $T_{ship}$) participate in a two-phase commit protocol that is coordinated by the TP-monitor. Unfortunately, in a real purchase process the buyer, seller, and bank agents belong to different enterprises. Consequently, the use of a single TP-monitor is unrealistic for this situation.

Purchase Process Modeled as a Nested Transaction

A second prior art approach is to model the purchase process as a nested transaction. In this approach, a top-level transaction ($T_{top}$) is needed and must be introduced. In this regard, the transactions, $T_{order}$, $T_{proc}$, $T_{payment}$, and $T_{ship}$ have to commit to $T_{top}$, (i.e., the effects of the transactions are made persistent through the top level transactions ($T_{top}$)). Unfortunately, as noted previously, the buyer, the seller and the bank are independent enterprises. Consequently, the transactions $T_{order}$, $T_{proc}$, $T_{payment}$, and $T_{ship}$ commit to their own databases. It is difficult, if not impossible, for a buyer to make the seller commit to the buyer's database since the transactions are distributed across enterprises. Therefore, implementing the conceptual transaction $T_{top}$ is not a trivial task and unrealistic for this situation.

Purchase Process Modeled as a Transactional Workflow

A third prior art approach models the purchase process as a transactional workflow. A workflow system provides flow control for business process automation. A business process often involves multiple steps, such as $T_{order}$, $T_{proc}$, $T_{payment}$, and $T_{ship}$. Each step represents a logical piece of work that contributes to the process. A workflow process represents the integration and synchronization of multiple actions. Although these actions and the agents that execute the actions can be distributed, the actions and agents are scheduled and coordinated by a centralized workflow engine. However, as illustrated in this example, the purchase process typically involves tasks that are executed in different enterprises, which are not under the control of a single workflow engine.

Based on the foregoing, there remains a need for an apparatus and method for modeling cooperative transactions to automate electronic commerce through the use of dynamic agents.

SUMMARY OF THE INVENTION

One feature of the present invention is that component transactions forming a cooperative transaction may be individual transactions executing on different enterprises and committing to different databases.

Another feature of the present invention is that component transactions forming a cooperative transaction are not controlled by any central transaction processing monitor or workflow engine.

Yet another feature of the present invention is that participating agents are enabled to represent different enterprises with self-interests.

A further feature of the present invention is that synchronization between agents is enabled by peer-to-peer communication and predetermined protocols.

The present invention provides a method and system for processing multi-agent cooperative transactions. A failure detector is provided for detecting whether a failure is an intra-enterprise failure or an inter-enterprise failure. An intra-enterprise failure handler is coupled to the failure detector for performing failure recovery for intra-enterprise failures. Failure recovery for intra-enterprise failures can include identifying the scope of failure recovery within a first enterprise. Once the scope of failure recovery has been identified, a top-down undo operation of sub-transactions in the identified scope may be performed within the first enterprise. An inter-enterprise failure handler is also coupled to the failure detector for performing failure recovery for inter-enterprise failures. Failure recovery for inter-enterprise failures can include identifying the scope of failure recovery in a second enterprise to which a failure in a first enterprise has been transferred. Once the scope of failure recovery has been identified, a top-down undo operation of subn-transactions in the identified scope may be performed in the second enterprise.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Purchase Process Modeled as a Transactional Agent Cooperation

The present invention provides a protocol-based, peer-to-peer agent cooperation method and apparatus. In contrast to the prior art approaches described earlier, the present invention does not rely on a centrally controlled coordinator. Instead, the present invention enables multi-agent cooperative activities by employing interactions of multiple autonomous activities that are governed by certain protocols. One aspect of the present invention is that the success of a cooperative activity requires the common understanding of and agreement on the underlying protocols by all the participating agents.

Exemplary Purchase Transaction

Figure 1:
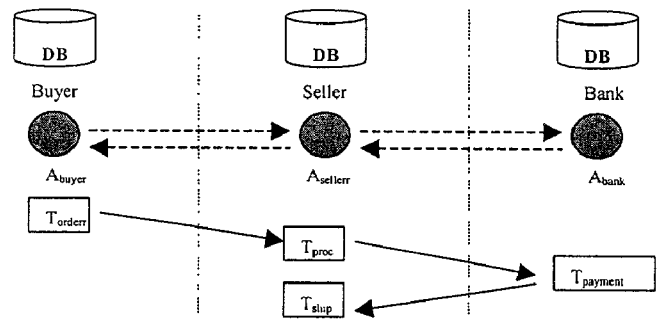
FIG. 1 is a block diagram of three parties commonly found in a purchase-sale transaction with their respective transactions and software agents.

FIG. 1 illustrates an exemplary purchase transaction or process that is configured in accordance with the cooperative transaction model of the present invention. The cooperative transaction model of the purchase process includes individual transactions, $T_{order}$, $T_{proc}$, $T_{payment}$, and $T_{ship}$, is carried out through the cooperation of agents belonging to the buyer, the seller and the bank that issued credit card to the buyer. These agents are denoted $A_{buyer}$, $A_{seller}$ and $A_{bank}$ respectively.

Transaction $T_{order}$ is executed by the agent $A_{buyer}$ and commits to the database on the buyer's side. The tasks of the transaction $T_{order}$ can include (1) filling a shopping basket, (2) making an order with the credit line for payment, etc.

Transaction $T_{proc}$ is executed by agent $A_{seller}$ and commits to the database on the seller's side. The transaction $T_{proc}$ can include (1) processing the order, (2) checking inventory, (3) sending a payment request to the bank, etc.

Transaction $T_{payment}$ is made by agent $A_{bank}$ and commits to the database on the bank's side. The transaction $T_{payment}$ can include (1) verifying the payment request, (2) checking credit, (3) approving the payment, etc.

Transaction $T_{ship}$ is made by agent $A_{seller}$ and commits to the database on the seller's side. The transaction $T_{ship}$ can include (1) making the shipment and (2) updating inventory.

The multi-agent cooperative transaction method of the present invention accomplishes the entire cooperative transaction (e.g., purchase process) through conversation among agents. It is noted that unlike the prior art approaches, the cooperative transaction is not controlled by any central coordinator. It is noted that an agent can request another agent to perform an action, or can delegate an action to another agent. For example, the buyer agent may delegate a price comparison task to another agent. In another example, the buyer agent can request the seller agent to process an order. Similarly, the seller agent can request the bank agent to approve the buyer's credit. Preferably, the results of these transactions are passed between agents via messaging.

Agents are autonomous and act in their own self-interests. An agent may fail, or a transaction may be canceled by any participating agent. If any exception condition occurs, such as the credit checking fails, or the shipment cannot be made, certain compensation transactions are executed. For instance, the buyer needs to update his database entry, indicating that the purchase and the payment were not made.

In summary, multi-agent cooperative transactions differ from conventional transactions in the following aspects. First, the participating agents may represent different enterprises with self-interests. Second, the component transactions forming a business process may be individual transactions running in different enterprises and committing to different databases. Third, the component transactions are not controlled by a central TP monitor or workflow engine. In general, there is no top-level transaction to which the component transactions can commit. Fourth, the synchronization of agents carrying out the component transactions is protocol-based and accomplished through peer-to-peer communication.

Cooperative Transaction Handling Mechanisms

Figure 2:
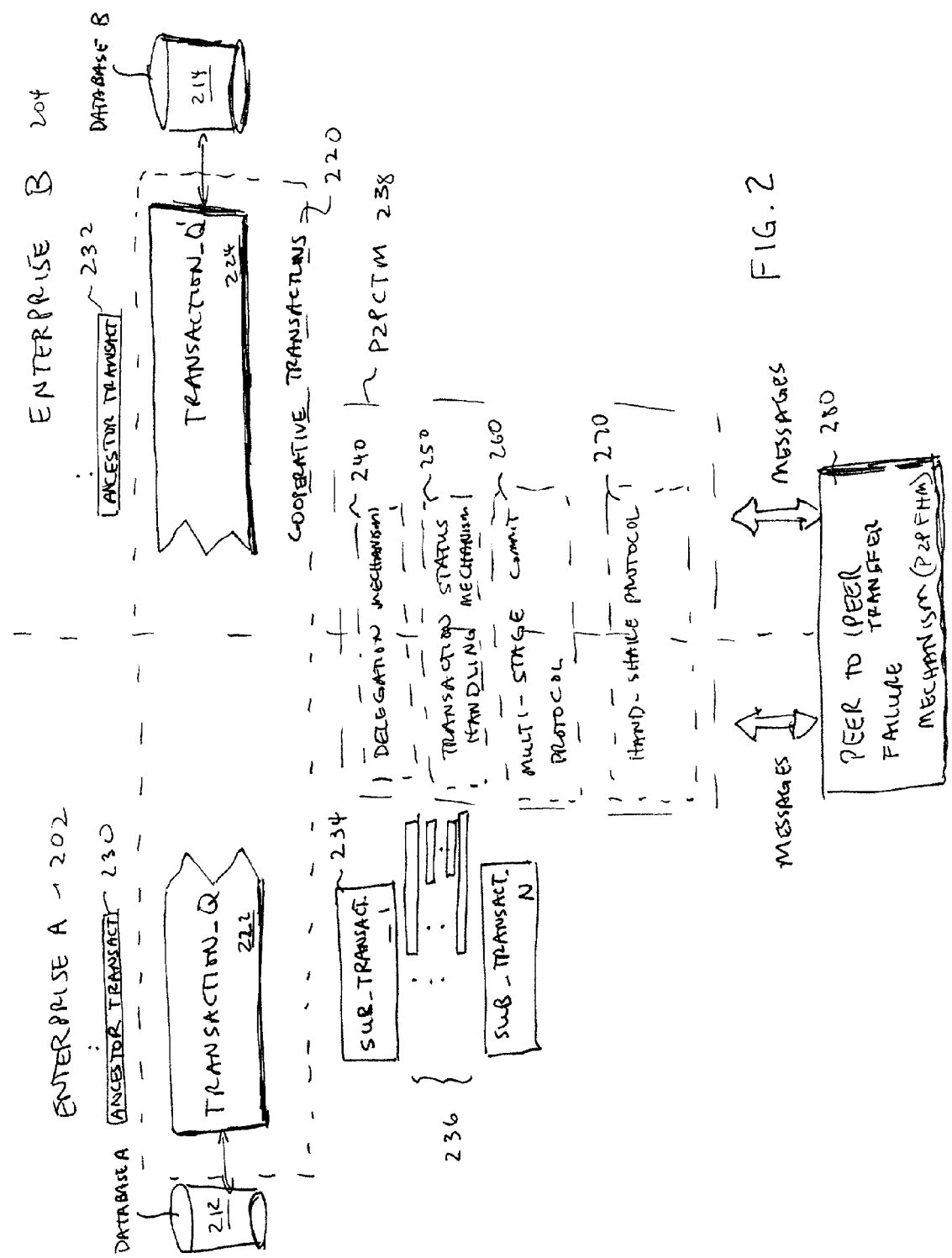
FIG. 2 is a block diagram illustrating various mechanisms employed by the present invention to enable a cooperative transaction involving two enterprises.

FIG. 2 is a block diagram illustrating various mechanisms employed by the present invention to enable a cooperative transaction involving two enterprises: a first enterprise 202 and a second enterprise 204. The first enterprise 202 (e.g., enterprise A) includes a plurality of transactions that commit to a first database 212, and the second enterprise 204 includes a plurality of transactions that commit to a second database 214. The term "enterprise" can refer to a business entity (e.g., a company or other organization), a logical set of computing resources (e.g., the database and software applications for the accounting department), or any other autonomous organization with self-interests.

The first database 212 or the second database 214 can be one or more databases or repositories of information maintained for the benefit of the enterprise in which the database resides. It is important to note that software agents of the first enterprise 202 cannot modify, update, or otherwise change the information stored in the database 214 of the second enterprise 204. Similarly, the software agents of the second enterprise 204 cannot modify, update, or otherwise change the information stored in the database 212 of the first enterprise 202. Consequently, the prior art approaches, which require a centralized coordinator, fail to model the realities in real world business situations. The present invention enables cooperative transactions with software agents, where the agents can commit to different databases and communicate by using peer-to-peer protocols.

Business transactions can be divided into two general types of transactions: 1) non-cooperative transactions (i.e., transactions that do not cooperate with transactions of a different enterprise) and 2) cooperative transactions (i.e., transactions that cooperate with at least one transactions of a different enterprise. An example of a non-cooperative transaction is an internal update of records in a database to reflect changes within the enterprise that do not depend on the actions of any third party (e.g., another enterprise).

An exemplary cooperative transaction 220 is shown that includes a transaction_Q 222 that is executed by one or more software agents in enterprise A 202 and a transaction_Q' 224 that is executed by one or more software agents in enterprise B 204. It is noted that transaction_Q 222 and transaction_Q' 224 form a logical "contract" (e.g., a purchase and sale contract). As described hereinafter, cooperative transactions can have cross-dependencies that cause failures in enterprise A to propagate to enterprise B. Similarly, these cross-dependencies can cause failures in enterprise B to propagate to enterprise A. A failure transfer mechanism 280 that employs messages is provided by the present invention to transfer or propagate these failures between enterprises.

The transactions may be nested and organized in a hierarchical fashion. For example, transaction_Q can have one or more ancestors (e.g., ancestors 230 and 233) and one or more sub-transactions (e.g., children or descendants 234). The sub-transaction 234 in turn can have nested sub-transactions 236. Similarly, transaction_Q' may have ancestors (e.g., ancestor 232) and sub-transactions (not shown).

P2PCTM 238

The peer-to-peer cooperative transaction mechanism (P2PCTM) 238 of the present invention includes a delegation mechanism 240, a transaction status handling mechanism 250, a multi-stage commit protocol 260, a handshake protocol, and a peer-to-peer failure handling mechanism (P2PFHM) 280. The delegation mechanism 240 provides support for the delegation of a task from one agent to another agent. The delegation mechanism 240 generates a copy of all information that is to be delegated to another agent (e.g., the task and the data container associated with the task) before such delegation occurs. In so doing, the delegation mechanism 240 enables the software agent to re-delegate to another agent in the event the first delegated agent fails to accomplish the task.

The transaction status handling mechanism 250 ensures that every agent that carries a transaction in a transaction hierarchy log the status of the whole family of transactions. Preferably, the status of the whole family of transactions includes all its direct ancestors and all the descendants beneath it. The transaction status handling mechanism 250 ensures that the persistent effects made by open transactions are known to their ancestors. Consequently, if the internal results are lost due to the failure of the carrying agents, these results can be re-generated. In one embodiment, an agent coordinator can be utilized to track the status all the agents.

The multi-stage commit protocol 260 manages a multi-stage commit protocol that includes at least two stages: (1) a preliminary commit stage and (2) a final commit stage. It is noted that intermediate states between the preliminary and final commit stages can be defined to suit a particular application. During the preliminary stage and all stages that are not the final commit stage, the first enterprise 202 and the second enterprise 204 do not commit to the transaction (e.g., information (e.g., data). Accordingly, the results are not written to databases 212 and 214, respectively, during the non-final stages.

When the final commit stage is reached, the revised data is actually updated in the database of each enterprise. For example, in the purchase and sale transaction, the seller agent, who is responsible for handling the shipping of the product, does not ship the product and deduct the number in inventory, until the agent receives a confirmation from the bank agent that a payment transaction has been successfully completed.

The handshake protocol 270 provides for the peer-to-peer communication between cooperative agents that includes an acknowledge signal to confirm the receipt of messages and other information (e.g., data containers, etc.). In this manner, agents can reliably communicate with other agents within the same enterprise and with other agents in other enterprises (i.e., across enterprises) and be quickly notified of problems in a communication path with a receiving agent. For example, when an acknowledgment is not received with a predetermined length of time, the sending agent can re-send the message or employ another receiving agent for a particular task. The peer-to-peer failure handling mechanism (P2PFHM) 280 is described in greater detail with reference to FIG. 3.

Peer-To-Peer Failure Handling Mechanism 280

Figure 3:
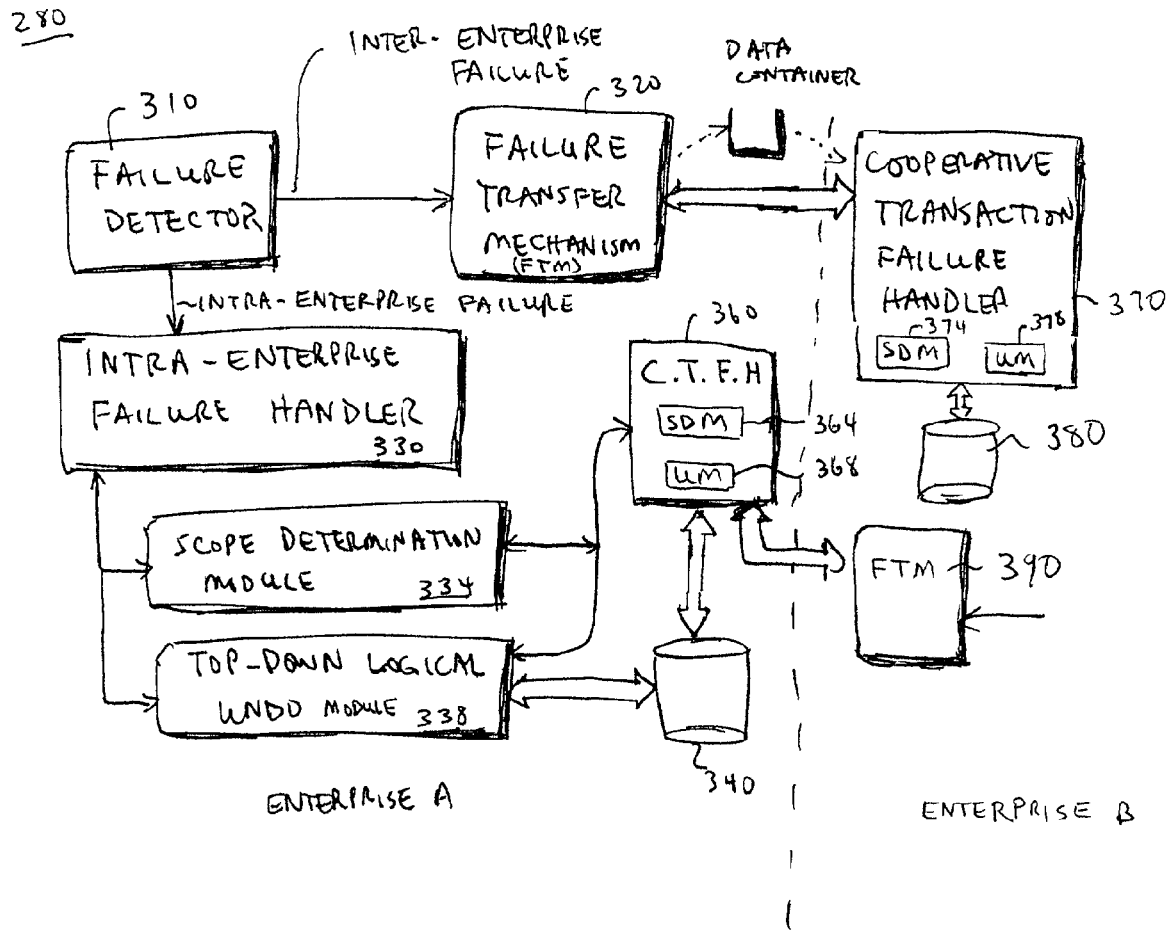
FIG. 3 is a block diagram illustrating in greater detail the peer-to-peer failure handling mechanism that is configured in accordance with one embodiment of the present invention.

FIG. 3 is a block diagram illustrating in greater detail the peer-to-peer failure handling mechanism 280 that is configured in accordance with one embodiment of the present invention. The peer-to-peer failure handling mechanism 280 includes a failure detector 310 for detecting failures and determining whether the failures are intra-enterprise failures (i.e., failures that affect only transactions within the enterprise) or inter-enterprise failures (i.e., failures that can affect transactions that are outside of the current enterprise). As described in greater detail hereinbelow, inter-enterprise failures stem from cooperative transactions that form a logical transaction and involve cross dependencies between the transactions.

An intra-enterprise failure handler 330 is coupled to the failure detector 310 to receive the intra-enterprise failure notification. The intra-enterprise failure handler 330 includes a scope determination module 334 for determining the scope of the failure and a top-down logical undo module 338 for undoing any changes made by the transaction. The top-down logical undo module 338 has access to database 340 for undoing any previously made changes. The steps performed by the intra-enterprise failure handler 330 are described in greater detail hereinafter with reference to the section entitled "Hierarchical Failure Handling."

A failure transfer mechanism 320 is coupled to the failure detector 310 to receive the inter-enterprise failure notification. The failure transfer mechanism 320 communicates (e.g., by using a data container) the failure to a cooperative transaction failure handler 370 that is disposed in enterprise B. The cooperative transaction failure handler 370 includes a scope determination module (SDM) 374 for determining the scope of the failure and a top-down logical undo module (UM) 378 for undoing any changes made by the software agents related to transactions executing in enterprise B. The top-down logical undo module (UM) 378 has access to the database 380 for undoing any previously made changes. The steps performed by the cooperative transaction failure handler 370 are described in greater detail hereinafter with reference to the section entitled "Cross-Transaction Tree Failure Handling." A failure transfer mechanism 390 is provided in enterprise B, and a cooperative transaction failure handler 360 that includes a scope determination module (SDM) 364 and a top-down logical undo module (UM) 368 is provided in enterprise A for transferring and handling failures transferred from enterprise B to enterprise A, respectively.

Multi-agent Cooperative Transaction Model

Transactions are atomic operations. However, agents have typically been characterized as autonomous carriers of operations. The present invention supports atomic transactions by autonomous agents, which is an important key to handling cooperative transactions.

As described earlier, the present invention supports both cooperation of multiple agents belonging to the same party (i.e., within a single enterprise) and cooperation of multiple agents belonging to different but contracting parties (i.e., between different enterprises).

Nested Transactions for Multi-Agent Cooperation Within a Single Enterprise

Processes that executed within a single enterprise are described first. Modeling such a process as a single flat transaction is unnecessary in most cases. Such processes are often organized as nested transactions. A transaction may consist of hierarchically structured sub-transactions to be executed by the same or different agents. A sub-transaction represents a logical piece of work that contributes to the whole transaction, and may be delegated by an agent to another. Thus, a transaction tree may actually map to an agent organization tree, with each agent corresponding to one or more sub-transactions.

A transaction hierarchy has a multilevel specification or template. Each transaction or sub-transaction may have sequential, concurrent or conditional steps as sub-transactions. The agent carrying a transaction (T) maintains the templates of sub-transactions beneath T. These sub-transactions may include all the descendant transactions of T, or only the child transactions of T when the detailed steps of those child transactions are determined by their respective hosting agents.

The present invention incorporates the ideas of contingency and non-vital transactions for providing failure protection. The failure of a non-vital transaction can be ignored by its parent, and a failed transaction T may be replaced by the contingency transaction (T*) associated with it. A transaction at any level may be paired with a contingency transaction that may in turn have its own contingency transaction. A transaction T may also be paired with a compensation transaction T° that can logically undo its effects. For example, a flight reservation may be compensated for by canceling that reservation. The contingency transaction or the compensation transaction associated with a transaction T may be flat or hierarchical and can be structured differently from T and executed by a different agent. The notion of vitalness underlies the failure recovery of multi-agent transactions (i.e., when and via which path to eliminate or compensate for certain previous effects).

Task Delegation Between Agents

In a transaction hierarchy, a parent transaction may delegate tasks to a child transaction, and such delegation is typically implemented by passing locks. When these transactions are carried by separate agents, task delegation is made by exchanging data containers through inter-agent communication. The present invention preferably utilizes a container model for dealing with the data flow between agents (i.e., agents pass data during transaction delegation).

Alternatively, the present invention can utilize a lock model, where the agents pass locks during transaction delegation. However, delivering locks to agents running remotely has more sensitive security and implementation problems than the container model.

Each transaction carried by an agent is associated with a data container managed by the hosting agent. This container holds the data checked out from databases or passed from other agents. The data objects in the container are accessible only to the transaction carried by the hosting agent. When agent A delegates a transaction T to agent B, it is A's responsibility to deliver sufficient data to B for executing T, according to the transaction specification.

Agent-based task delegation offers certain flexibility in transaction control. For example, when the agent, say P, carrying a parent transaction determines that the agent carrying a child transaction is dead without performing the assigned task, P can re-assign the task to another agent.

However, when a parent transaction and a child transaction are carried by different agents, additional dependencies are introduced between these agents. For instance, suppose that after a child transaction has purchased a ticket, the carrying agent (C) becomes unreachable by the agent (P) that carries the parent transaction. In this event, P may not know whether the ticket was purchased or not purchased. Consequently, in order to support reliable task delegation and commit control, the following protocols are provided by the present invention.

First, all communication between agents involved in a transaction is based on a handshake protocol with acknowledgment. Second, a 2PC-like protocol should be used in the commitment of a child transaction to its parent transaction if the child transaction is an open transaction that updates the database. Third, an agent delegating a task to another agent maintains a copy of the delegated task and corresponding data container in order to re-delegate to another agent, if necessary. Fourth, every agent that carries a transaction in a transaction hierarchy logs the status of the whole family of transactions, including all its direct ancestors and all the descendants beneath it. In this manner, their ancestors know the persistent effects made by open transactions. Consequently, when internal results are lost due to the failure of the carrying agents, the internal results can be re-generated. An agent coordinator can be utilized to keep track of all the agents.

Contracting Transactions for Inter-Enterprise Multi-Agent Cooperation

It is noted that an inter-enterprise cooperative transactional process, such as a purchase process or an auction process, is considered as an atomic transaction only conceptually. In other words, every participating party honors the results based on certain contracts. The concept of contract is rather broad, and can include making an agreement, exchanging information, making a purchase, etc. A contract involves multiple parties and usually is not controlled by a single party. For example, a purchase is made by two separate but contracting transactions. One transaction is on the buyer side, and the other transaction is on the seller side. The contract that represents the interaction of multiple participating transactions, which belong to different business processes, is not a single transaction that is physically carried by any agent.

Instead, the process is initiated by one agent sending a request to another and completed with the completion of a buy transaction and a sell transaction. The results of a contract are shared by the participating transactions, and thus, visible to the interactive business processes.

The agents, participating in a contract, communicate in terms of messaging. Certain component transaction templates, such as shopping, negotiation, auctions, are provided as common protocols for interaction among agents. These templates serve as the building blocks for transactional agent interaction.

Cross-transaction Dependencies

The relationship between two transactions (e.g., $T_a$ and $T_b$) that are involved in a contract can be expressed in terms of inter-transaction dependencies. For example, in a purchase process, the buyer side and the seller side have individual peer transactions committing to their own databases. There exist dependencies, such as a start dependency and a failure dependency, between these peer transactions. For example, a selling transaction ($T_{sell}$) is triggered by a buying transaction ($T_{buy}$). Similarly, when $T_{buy}$ aborts, $T_{sell}$ also aborts.

In multi-agent cooperative transactions, the enforcement of transaction dependencies by the present invention is not centralized, but instead is accomplished through point-to-point or multicast event notification. If transaction $T_{buy}$ has a commit dependency on $T_{sell}$, $T_{buy}$ waits until it receives a commit notification from $T_{sell}$ to commit. The commit notification may be sent by utilizing, for example, point-to-point communication or multicast communication depending on the application. Furthermore, some dependencies can be mutual. For example, $T_{sell}$ also depends on the commitment of $T_{buy}$. To avoid ambiguity or circular dependencies the present invention introduces the following special cross-transaction dependencies.

Consider two transactions, such as $T_a$ and $T_b$ that are involved in a contract. $T_a$ and $T_b$ are individual transactions without a commit-to relationship, but $T_a$ and $T_b$ are dependent on each other to commit. As in a regular transaction, a transaction (e.g., $T_a$) involved in a contract, experiences state transition at run time. In addition, a transaction (e.g., $T_a$) involved in a contract has a special state referred to as a settle state. The settle state means that the transaction has reached an agreement with the other transactions involved the same contract. For example, $T_a$ and $T_b$ can commit provided that the transactions are in the settle state (or a prepare-to-commit state), which represents a mutual dependency between them.

Two important dependencies between two transactions $T_a$ and $T_b$ participating in a contract are a mutual settle dependency and a mutual abort/compensate dependency. A mutual settle dependency ($T_a \leftrightarrow_{Settle} T_b$) specifies that $T_a$ and $T_b$ cannot commit until they reach agreement on the contract. A mutual abort/compensate dependency ($T_a \leftarrow_{ac} T_b$) specifies that if $T_a$ aborts, then $T_b$ must be either aborted or compensated for.

The notion of vitalness is used to isolate failures from transactions that participate in a contract. The failure of one participant may not have a critical impact on another participant, and failing to make a contract may not be fatal to either of them. A transaction participating in a contract may have a different vitalness to its parent transaction as compared with peer transactions. It is noted that vitalness may be one-directional or bi-directional.

Commit Control

In nested transactions, data objects held by a transaction are visible to its descendants, meaning that a sub-transaction can access without conflict any object currently accessed by one of its ancestors. Thus, a transaction T can acquire objects from databases or inherit objects from its parent or ancestors; these objects form the access set of T. A transaction $T_i$ may delegate the commit/abort responsibility of its operations on certain objects to another transaction $T_j$, which form a delegate set.

Unlike conventional transactions, the access-set of a transaction T is physically carried by the hosting agent of T, $A_T$. An access-set is visible by T's sub-transactions (i.e., those sub-transactions can send a query to $A_T$ for checking out the data objects in the access set visible to them). It is important for $A_T$ to validate the requesters before sending out the data.

The data about a contract are visible to all participating transactions and their hosting agents. Since a contract is simply conceptual, rather than a transaction carried by a hosting agent, contract related data is acquired through message exchange between the agents participating in the contract.

If transaction P is a parent of T (denoted $T \leq P$), then the following notions can be introduce.

Transaction T commits-to P means that T delegates the commit/abort responsibility for its entire access set to P, where P is referred to as the commit scope of T.) In agent-carried transactions, when different host agents carry T and P, the host agent for T should send its entire results to the host agent for P.

Transaction T commits-through P to G means that $T \leq P \leq G$ and the commit/abort responsibility of Ts entire access-set is directly or transitively delegated from T to P, and then from P to G. For agent-carried transactions, this involves a sequence of messages among the corresponding hosting agents.

Transaction T commits-over P to G means that $T \leq P \leq G$ and T commits-to G without committing through P. When P is carried by a separate agent, that agent is bypassed.

The commit scope of a closed transaction T is its parent transaction. Typically, T commits-through its parent to higher-level ancestors level by level up to the top-level transaction. Its effects are made visible to public only after the top-level transaction commits to database. These semantics enforce the atomicity of each sub-transaction with respect to its parent, and consequently, enforces the top-level atomicity of the whole transaction hierarchy. The commit scope of an open transaction T is the database, making its results visible to public. In this manner, concurrency is improved in executing other transactions requiring those results.

Failure Recovery

When multiple agents are involved in a logically atomic transaction, each agent may individually fail. A failure may be caused by the transaction itself, referred to as a transaction failure, or by the failure of a component (e.g., such as an agent, a communication channel, or a computer), referred to as a component failure. Using agents provides flexibility for transaction failure recovery. For example, a sub-transaction may be delegated to an alternative agent in case of failure. In general, failure recovery also requires cooperation among multiple agents.

For agent specific component failure handling, the mechanisms described above in connection with protocols are needed. The mechanisms of the present invention to handle failures in multi-agent cooperative transactions are now described.

The intra-enterprise failure handler 330 of the present invention provides failure recovery along a single transaction hierarchy, where multiple agents may carry sub-transactions. Furthermore, the failure transfer mechanism 320 and the cooperative transaction failure handler 370 of the present invention provides failure recovery across transaction hierarchies and across enterprises. For example, a purchase may be considered as an atomic activity logically, but actually involves two related but individual transactions (i.e., one transaction for the buyer side and one transaction for the seller side). A failure on one side may have impact on the other, and the failure recovery in this situation requires certain special mechanisms that are describe hereinbelow.

Hierarchical Failure Handling

Failure handling in a transaction hierarchy in accordance with the present invention includes two tasks: 1) identifying the failure recovery scope, and 2) a top-down undo operation of the sub-transactions in that scope.

Failure Recovery Scope Identification

Figure 4:
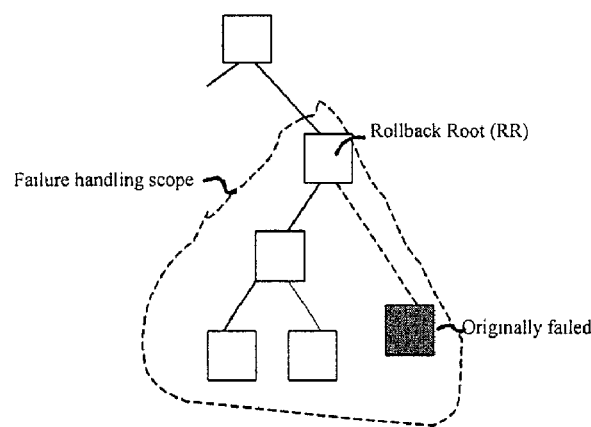
FIG. 4 illustrates the determination of an undo scope for an exemplary transaction in accordance with one embodiment of the present invention.

FIG. 4 illustrates the determination of an undo scope for an exemplary transaction in accordance with one embodiment of the present invention. Referring to FIG. 4, in a transaction hierarchy, the failure of a sub-transaction may propagate to its parent or higher level ancestors. However, the whole business process may be aborted in the following cases. First, when a transaction is non-vital to its parent, its abortion can be ignored, and the parent transaction can continue. Second, when the failure of a child transaction is recognized as the result of agent malfunction, the parent transaction may delegate the sub-transaction to another agent. Third, when a transaction can be replaced by a contingency transaction acting as its exception handler, upon its abortion, the process can continue by retrying the contingency transaction. In summary, when a transaction T fails, before reaching the top, the "abort-up" chain can terminate at such a closest ancestor of T, say R, that is non-vital or associated with a contingency transaction. From R, the process may then roll forward.

In either case, sub-transactions beneath R should be first undone in terms of two general functions: 1) abort function and 2) compensation function. The sub-transactions with effects internal to R are aborted, and the sub-transactions committed over R (e.g., the database or the top-level transaction) are compensated for in the corresponding scope. Since R is the root of the transaction sub-tree to be logically undone upon Ts failure, it is referred to as the Rollback Root (RR) of T.

Top-down Logical Undo Operation

When a sub-transaction in a transaction hierarchy fails and causes its parent or higher level ancestors to abort, its RR, say $T_{RR}$, is the highest ancestor in the abort-up chain, the root of the transaction sub-tree to be logically undone, and possibly, the restart point for rolling forward through an alternative path. Q. Chen and Umesh Dayal, "Failure Recovery across Transaction Hierarchies", Proc. of 13th International Conference on Data Engineering (ICDE-97), 1997, UK describes an exemplary two phase failure handling algorithm. This exemplary two phase failure handling algorithm can be employed in a distributed agent environment to support peer-to-peer cooperative transactions.

The logical undo is performed by aborting or compensating for the transactions in the undo scope (i.e. a sub-tree of transactions). Compensating the effects of a transaction only provides a logical equivalence of undoing, without necessarily restoring the objects updated by that transaction to their original states, or eliminating side effects that may have affected other transactions already (e.g. a hotel reservation may be compensated for by canceling that reservation). Whether the effects of a transaction under $T_{RR}$ should be aborted or compensated for, depends on the visibility scope of these effects.

In general, if a transaction is in-progress or tentatively committed (to parent), then it should be aborted (with its committed sub-transactions compensated for). This is because its effects are still internal to the subtree rooted by $T_{RR}$. Otherwise, if it has committed over $T_{RR}$ to the top-level transaction or database, then it should be compensated for in the corresponding scope (if its effects are not compensated for at a higher level) since its effects have been externalized beyond $T_{RR}$ already. However, for a closed sub-transaction that has committed to its parent, compensation is never applicable; its effects may be eliminated either by aborting or by compensating an ancestor at a higher level It is noted that compensating for the effects of a transaction may be done by the agent that originally carries that transaction or by another agent.

Cross-Transaction Tree Failure Handling

Many e-commerce processes are transactional. Very often, such a process is conceptually atomic, but is actually made by separate transactions running by different parties. In the case of failure, the participating transactions are recovered individually. However, due to the presence of contracts between those transactions, a failure that occurs in one transaction tree (or sub-tree) may have to be transferred to the other sub-trees. Consequently, there is the need for failure handling across transaction hierarchies. The present invention implements contracts by peer-to-peer transaction interactions in the form of inter-agent communications.

Figure 8:
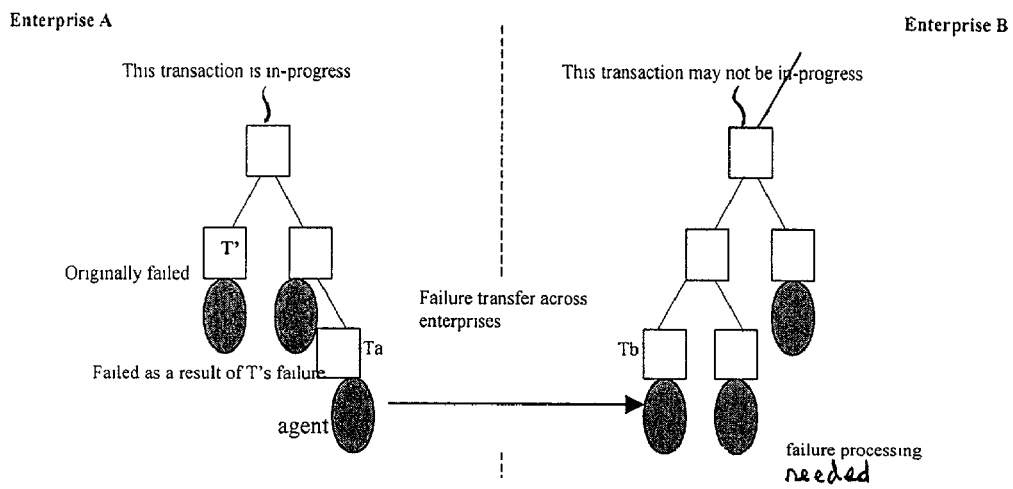
FIG. 8 illustrates how a failure in a first enterprise can be transferred to a second enterprise.

In the transaction tree where a failure originally occurs, the parent and (direct) ancestors up to the RR of the originally failed transaction are still in-progress since they may not terminate until all its child transactions terminate. However, referring to FIG. 8, in a transaction tree where a failure is transferred in, the transaction to which the failure is transferred in, and its ancestors, may be committed and need to be compensated for since their results have become invalidated as a result of such failure. To handle such a situation both RR and scoped-rollback algorithm are extended.

Consider two cooperative transactions with sub-transactions $T_a$ and $T_b$, respectively, that are involved in a contract. In this example, the contract is vital to both sides. When $T_a$ fails itself or in the undo scope as a result of other sub-transaction's failure, the failure is transferred to $T_b$. Then, each transaction tree has an individual recovery scope for undoing. When $T_a$ fails, its parent and (direct) ancestors up to the RR of $T_a$ are still in-progress. However, when this failure is transferred to $T_b$, the situation may be different. When $T_b$ has not started, failure handling on $T_b$ is not performed. When $T_b$ is in-progress, $T_b$ can be treated as the original failure point in the transaction tree. Also, the RR of $T_b$ may be determined as the root of recovery in the same manner as described previously. When $T_b$ has completed, $T_b$ should be invalidated (i.e., $T_b$ should be compensated for at the same level or at a higher level).

In the last case, the invalidation of $T_b$ causes its parent to be aborted when the parent is in-progress and $T_b$ is vital to it or invalidated when the parent has committed, regardless of the vitalness of $T_b$ to it. When $T_b$ commits through its parent or ancestors, even if $T_b$ is defined with a compensation transaction, the commit scope of that compensation is unclear. The invalidate/abort signal may propagate up to $T_b$'s ancestors, but may or may not terminate at the RR of $T_b$ because the RR of $T_b$ may also be in one of the different situations described below.

Figure 5:
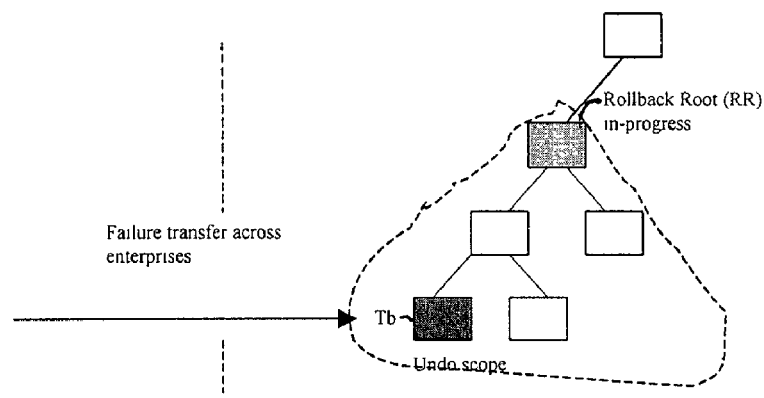
FIG. 5 illustrates the case where a rollback root is in-progress in accordance with one embodiment of the present invention.
Figure 6:
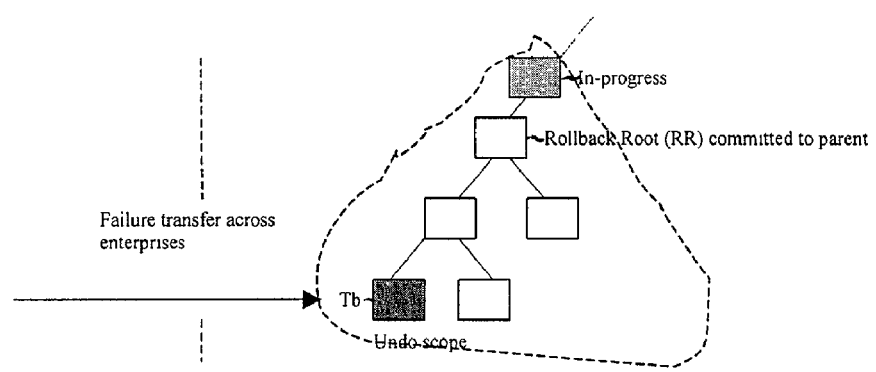
FIG. 6 illustrates the case where a rollback root is committed and its parent is in-progress in accordance with one embodiment of the present invention.

In the first situation, the RR of $T_b$ is in-progress. Referring to FIG. 5, the present invention selects the RR of $T_b$ as the root of recovery for this case. In the second situation, referring to FIG. 6, the RR of $T_b$ has committed either to its parent or an ancestor, but its own parent is in-progress and RR of $T_b$ is either non-vital or associated with a contingency transaction (i.e., the RR of $T_b$ is the RR of itself). The present invention selects the parent of RR of $T_b$ as the root of recovery for this case.

Figure 7:
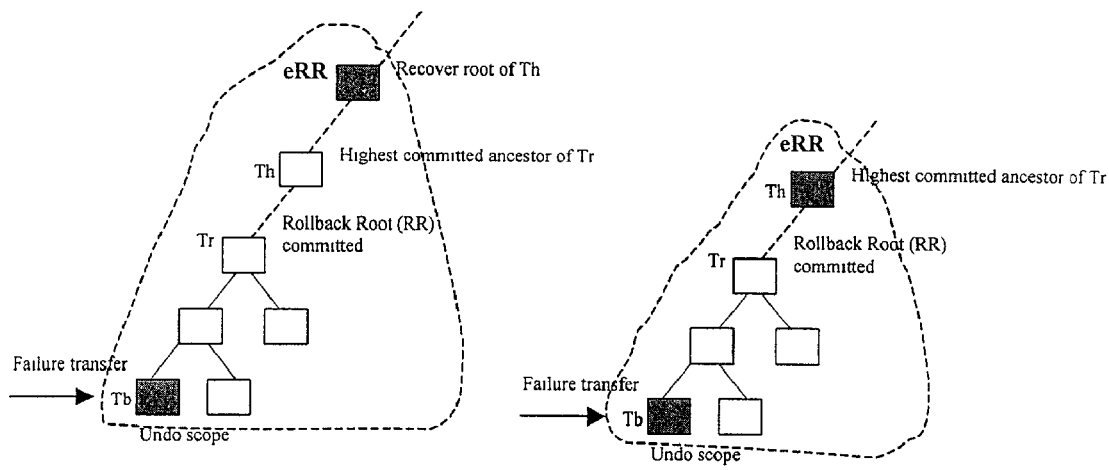
FIG. 7 illustrates two cases of extended rollback root in accordance with one embodiment of the present invention.

FIG. 7 illustrates two cases of extended rollback root in accordance with one embodiment of the present invention. In the third situation, both the RR of $T_b$ and its parent or even other ancestors have committed. In this case, the RR of $T_b$ cannot be simply taken as the root of recovery. The present invention handles this situation by first determining a transaction (denoted $T_h$) that is the highest committed ancestor of the RR of $T_b$. Then, the present invention determines the RR of $T_h$. If the RR of $T_h$ is an in-progress transaction, then the present invention selects the RR of $T_h$ as the extended rollback root (eRR) of $T_b$ for recovery. Otherwise, the RR of $T_h$ must be $T_h$ itself. In this case, the present invention selects the parent of $T_h$ as the eRR of $T_b$ for recovery.

In general, the eRR of the transaction (e.g., $T_b$ described above) is an in-progress transaction (i.e., an uncommitted transaction), unless the highest committed ancestor of $T_b$ is the top-level transaction.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A system, comprising:
   a plurality of enterprises having agents that process multi-agent cooperative business transactions, wherein each agent is configured to autonomously determine whether to complete a transaction;
   a failure detector for detecting whether a failure is an inter-enterprise failure or an intra-enterprise failure;
   an intra-enterprise failure handler coupled to the failure detector for performing failure recovery for intra-enterprise failures; and
   an inter-enterprise failure handler coupled to the failure detector for performing failure recovery for inter-enterprise failures,
   wherein the inter-enterprise failure handler includes
      a scope determination module for indentifying a failure recovery scope; and
      a top-down logical undo module coupled to the scope determination module for undoing sub-transactions in an identified scope in a top-down manner.

2. The system of claim 1 wherein the intra-enterprise failure handler includes
   a scope determination module for identifying a failure recovery scope; and
   a top-down logical undo module coupled to the scope determination module for undoing sub-transactions in an identified scope in a top-down manner.

3. The system of claim 2 wherein the scope determination module terminates at a closest ancestor of the failed transaction that is one of non-vital and associated with a contingency transaction.

4. The system of claim 2 wherein in the scope determination module,
   if a failed transaction is non-vital to its parent, continues with the parent transaction;

if a failed sub-transaction is determined to be a result of agent malfunction, the parent transaction delegates the sub-transaction to another agent; and if a failed transaction is associated with a contingency transaction, re-tries the contingency transaction.

5. The system of claim 1 wherein in the top-down logical undo module, if a transferred transaction has not started, does not perform failure handling on the transferred transaction;

if a transferred transaction is in progress, determines a rollback root of the transferred transaction; and if a transferred transaction has completed, compensates for the transferred transaction.

6. The system of claim 5 wherein in the top-down logical undo module, if the rollback root of the transferred transaction is in progress, utilizes the rollback root as the root of recovery;

if the rollback root of the transferred transaction has committed to one of a parent and an ancestor, the parent is in-progress, and the rollback root of the transferred transaction is one of non-vital and associated with a contingency transaction, utilizes a parent of the rollback root as the root of recovery; and if the rollback root of the transferred transaction and a parent of the rollback root have committed, determines a highest committed ancestor of the rollback root of the transferred transaction and determines whether the rollback root of the highest committed ancestor is in progress;

if the highest committed ancestor is in progress, the highest committed ancestor of the rollback root of the transferred transaction is utilized as an extended rollback root;

if the highest committed ancestor is not in progress, the parent of the highest committed ancestor of the rollback root of the transferred transaction is utilized as an extended rollback root.

7. A method, comprising:

starting a multi-agent cooperative business transaction between software agents of at least two enterprises;

detecting whether a failure is an inter-enterprise failure or an intra-enterprise failure;

when the failure is an intra-enterprise failure, performing failure recovery for the intra-enterprise failure; and when the failure is an inter-enterprise failure, performing failure recovery for the inter-enterprise failure, wherein performing failure recovery for the inter-enterprise failure includes identifying the failure recovery scope and undoing sub-transactions in the identified scope in a top-down manner.

8. The method of claim 7 wherein the step of when the failure is an intra-enterprise failure, performing failure recovery for the intra-enterprise failure includes identifying the failure recovery scope; and undoing sub-transactions in the identified scope in a top-down manner.

9. The method of claim 7 wherein identifying the failure recovery scope includes the step of terminating at a closest ancestor of the failed transaction that is one of non-vital and associated with a contingency transaction.

10. A system, comprising:

a plurality of computer-based enterprises having software agents that process multi-agent cooperative business transactions wherein each agent is configured to autonomously make decisions that affect completion of a business transaction; and a failure detector that detects if a business transaction fails; and a failure handler coupled to the failure detector for performing failure recovery, wherein the failure handler aborts a transaction if the transaction is determined to be non-vital to an associated parent transaction.

11. The system of claim 10 wherein the plurality of software agents communicate based on a peer-to-peer mechanism that enables an agent to delegate a task to another agent and to copy information that is to be delegated to said other agent.

12. The system of claim 10 wherein the plurality of software agents communicate based on a peer-to-peer mechanism that enables each agent to log hierarchies of related transactions and to recover a logged transaction if a failure occur.

13. The system of claim 10 wherein the plurality of software agents communicate based on a peer-to-peer mechanism that includes a preliminary commit stage and a final commit stage.

14. The system of claim 10 wherein, if a failure of a child transaction is determined to result from a malfunction of a first agent, the failure handler delegates a transaction from the first agent to a second agent.

15. The system of claim 10 wherein the failure handler replaces a failed transaction with a contingency transaction.

16. The system of claim 10 further comprising, a first database that stores transaction data related to a first enterprise; and a second database that stores transaction data related to a second enterprise;

wherein at least one agent is committed to the first database and at least one agent is committed to the second database.

* * * * *